(12) United States Patent
Roh et al.

(10) Patent No.: US 12,343,303 B2
(45) Date of Patent: Jul. 1, 2025

(54) MOTION ASSISTANCE APPARATUS

(71) Applicant: Samsung Electronics Co., Ltd., Suwon-si (KR)

(72) Inventors: Se-Gon Roh, Suwon-si (KR); Jeonghun Kim, Suwon-si (KR); Minhyung Lee, Seoul (KR); Youn Baek Lee, Yongin-si (KR); Jongwon Lee, Suwon-si (KR); Byungjune Choi, Gunpo-si (KR); Hyun Do Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 17/667,623

(22) Filed: Feb. 9, 2022

(65) Prior Publication Data

US 2022/0151857 A1 May 19, 2022

Related U.S. Application Data

(63) Continuation of application No. 15/788,218, filed on Oct. 19, 2017, now Pat. No. 11,259,978.

(30) Foreign Application Priority Data

Jul. 24, 2017 (KR) ........................ 10-2017-0093603

(51) Int. Cl.
*A61H 3/00* (2006.01)
*A61H 1/02* (2006.01)
(Continued)

(52) U.S. Cl.
CPC ............. *A61H 3/00* (2013.01); *A61H 1/0244* (2013.01); *F16H 1/46* (2013.01); *F16H 57/08* (2013.01);
(Continued)

(58) Field of Classification Search
CPC ....................................... A61H 3/00
See application file for complete search history.

(56) References Cited

U.S. PATENT DOCUMENTS 6,310,455 B1 10/2001 Siraky et al.
9,003,903 B2 4/2015 Drumm
(Continued)

FOREIGN PATENT DOCUMENTS

EP 2982360 A2 * 2/2016 ............. A61H 1/024
EP 2982482 A1 * 2/2016 ............... A61F 2/70
(Continued)

OTHER PUBLICATIONS

Korean Notice of Allowance dated Feb. 22, 2023 for KR Application No. 10-2022-0176266.
(Continued)

*Primary Examiner* — Jacqueline Woznicki
(74) *Attorney, Agent, or Firm* — NIXON & VANDERHYE P.C.

(57) ABSTRACT

A motion assistance apparatus which may include a proximal support configured to support a proximal part of a user, a distal support configured to support a distal part of the user, a hollow actuator on the proximal support, a reducer inserted in the hollow actuator such that an input end of the reducer is connected to an output end of the hollow actuator, and a driving frame configured to connect an output end of the reducer to the distal support.

2 Claims, 6 Drawing Sheets

(51) Int. Cl.
*F16H 1/46* (2006.01)
*F16H 57/02* (2012.01)
*F16H 57/08* (2006.01)

(52) U.S. Cl.
CPC .............. *A61H 2003/007* (2013.01); *A61H 2201/1215* (2013.01); *A61H 2201/1463* (2013.01); *A61H 2201/1628* (2013.01); *A61H 2201/1671* (2013.01); *F16H 2057/02034* (2013.01)

(56) References Cited

U.S. PATENT DOCUMENTS

| | | | |
|---|---|---|---|
| 9,057,429 | B2 | 5/2015 | Yokovama |
| 9,644,727 | B2 | 5/2017 | Yajima |
| 10,064,778 | B2 | 9/2018 | Moon et al. |
| 2006/0142105 | A1 | 6/2006 | Kudoh et al. |
| 2007/0126244 | A1 | 6/2007 | Ilea et al. |
| 2013/0296746 | A1* | 11/2013 | Herr ............... A63B 23/0405 601/34 |
| 2014/0049094 | A1 | 2/2014 | Cho et al. |
| 2014/0070600 | A1 | 3/2014 | Park |
| 2015/0335514 | A1 | 11/2015 | Choi et al. |
| 2016/0030271 | A1* | 2/2016 | Roh ............... A61H 1/0244 74/89.22 |
| 2016/0156249 | A1 | 6/2016 | Chen et al. |
| 2019/0110908 | A1* | 4/2019 | Lee ............... A61B 5/1071 |
| 2022/0176561 | A1* | 6/2022 | Smith ............... B25J 9/0006 |

FOREIGN PATENT DOCUMENTS

| | | | | |
|---|---|---|---|---|
| EP | 3275602 | A1 * | 1/2018 | ............... A61H 3/00 |
| EP | 3290746 | A1 * | 3/2018 | ............... A61F 2/70 |
| EP | 3470042 | A1 * | 4/2019 | ............ A61B 5/1071 |
| JP | 2016214976 | A | 12/2016 | |
| KR | 10-1488192 | B1 | 1/2015 | |
| KR | 10-2015-0039386 | A | 4/2015 | |
| KR | 10-1530171 | B1 | 6/2015 | |
| KR | 10-20160014299 | A | 2/2016 | |
| KR | 10-2016-0034174 | A | 3/2016 | |
| KR | 10-2016-0046358 | A | 4/2016 | |
| KR | 10-2017-0011125 | A | 2/2017 | |
| KR | 10-2017-0021108 | A | 2/2017 | |
| KR | 10-2017/0024013 | A | 3/2017 | |
| WO | WO2011049171 | A1 | 4/2011 | |
| WO | WO-2018209198 | A1 * | 11/2018 | ............... A61F 2/70 |
| WO | WO-2023043065 | A1 * | 3/2023 | ............ A61H 1/0244 |

OTHER PUBLICATIONS

U.S. Appl. No. 15/788,218, filed Oct. 19, 2017; Roh et al.
Korean Notice of Allowance dated Sep. 15, 2022 for KR Application No. 10-2017-0093603.
Korean Notice of Allowance dated Jan. 25, 2024 for KR Application No. 10-2023-0064642.

* cited by examiner

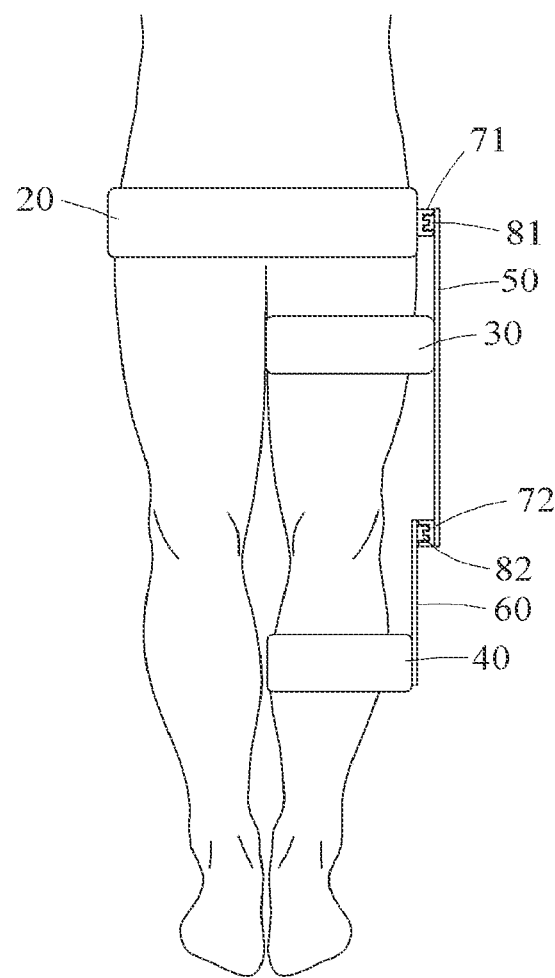

MOTION ASSISTANCE APPARATUS

CROSS-REFERENCE TO RELATED APPLICATION

This application is a Continuation of U.S. application Ser. No. 15/788,218, filed Oct. 19, 2017, which claims priority to KR 10-2017-0093603, filed on Jul. 24, 2017, the entire contents of which are all hereby incorporated herein by reference in their entireties.

BACKGROUND

1. Field

At least one example embodiment relates to a motion assistance apparatus.

2. Description of the Related Art

With the onset of rapidly aging societies, an increasing number of people may experience inconvenience and/or pain from joint problems. Thus, there may be a growing interest in motion assistance apparatuses enabling the elderly and/or patients having joint problems to walk with less effort.

SUMMARY

Some example embodiments relate to a motion assistance apparatus.

In some example embodiment, the motion assistance apparatus may include a proximal support configured to support a proximal part of a user; a distal support configured to support a distal part of the user; a hollow actuator on the proximal support, the hollow actuator including an input end and an output end; a reducer including an input end and an output end, the reducer being in the hollow actuator such that the input end of the reducer is connected to the output end of the hollow actuator; and a driving frame configured to connect the output end of the reducer to the distal support.

In some example embodiments, the hollow actuator may include a stator connected to the proximal support; and a rotor configured to rotate relative to the stator.

In some example embodiments, the motion assistance apparatus may further include a housing including a lower cover and an upper cover, the lower cover connected to the proximal support and configured to fix a bottom of the stator, and the upper cover connected to the lower cover and configured to fix a top of the stator.

In some example embodiments, the upper cover may include a protrusion configured to extend toward an internal space of the stator.

In some example embodiments, the rotor may include a main plate parallel to the lower cover, and a vertical extension between the stator and the protrusion.

In some example embodiments, the main plate includes a sun gear at a center of the main plate, the protrusion includes a ring gear in an inner side of the protrusion toward a center of the protrusion, the reducer includes, a plurality of planetary gears between the sun gear and the ring gear, the plurality of planetary gears configured to engage with the sun gear and the ring gear; and a carrier connected to a central axis of each of the plurality of planetary gears, and the driving frame is connected to the carrier.

In some example embodiments, the motion assistance apparatus may further include a plurality of bearings configured to resist shaking of central axes of the sun gear, the ring gear, and the plurality of planetary gears.

In some example embodiments, the plurality of bearings may include a first bearing between the rotor and the upper cover, a second bearing between the rotor and the lower cover, a third bearing between the upper cover and the carrier.

In some example embodiments, the first bearing is configured to contact a top of the rotor and an inner side of the rotor, and the second bearing is configured to contact a bottom of the rotor and an outer side of the rotor.

In some example embodiments, the main plate includes a first sun gear at a center of the main plate, the protrusion includes a ring gear in an inner side of the protrusion toward a center of the protrusion, the reducer includes, a plurality of first planetary gears between the first sun gear and the ring gear; a first carrier connected to a central axis of each of the plurality of first planetary gears; a second sun gear at a center of the first carrier; a plurality of second planetary gears between the second sun gear and the ring gear; and a second carrier connected to a central axis of each of the plurality of second planetary gears, and the driving frame is connected to the second carrier.

Other example embodiments also relate to a motion assistance apparatus.

In some example embodiments, the motion assistance apparatus may include a proximal support configured to support a proximal part of a user; a first hollow actuator connected to the proximal support; a first reducer in the first hollow actuator such that the first reducer is connected to the first hollow actuator; a first driving frame connected to the first reducer; a second hollow actuator connected to the first driving frame; a second reducer in the second hollow actuator such that the second reducer is connected to the second hollow actuator; and a second driving frame connected to the second reducer.

In some example embodiments, the first reducer and the second hollow actuator may be connected to respective ends of the first driving frame.

In some example embodiments, the first reducer and the second hollow actuator may be connected to a same side of the first driving frame.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 6 illustrates a motion assistance apparatus according to at least one example embodiment.

DETAILED DESCRIPTION

Figure 1:
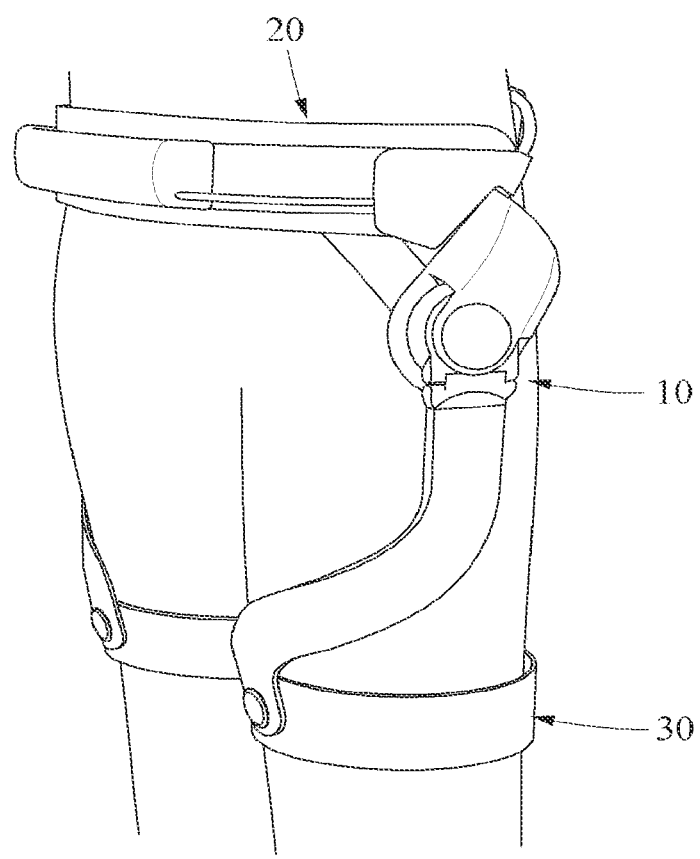
FIG. 1 illustrates a user wearing a motion assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
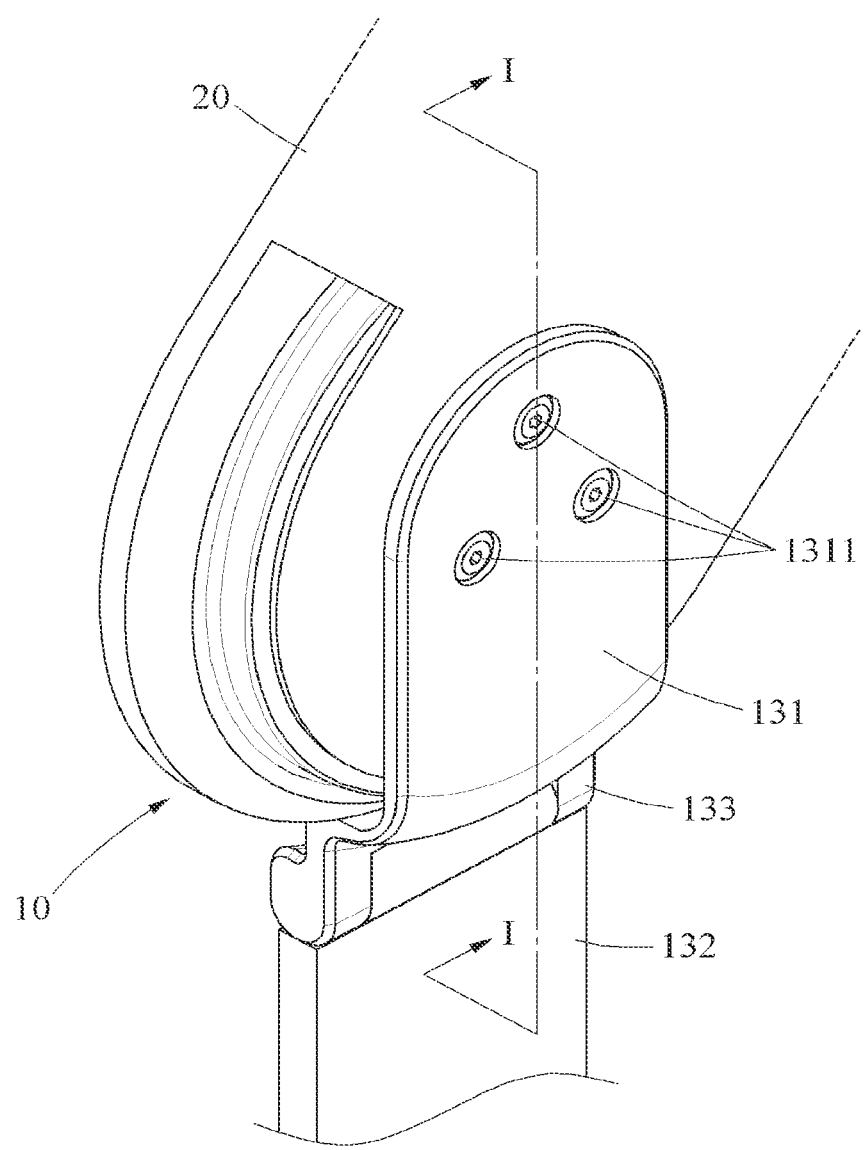
FIG. 2 is a perspective view illustrating a motion assistance apparatus according to at least one example embodiment.

FIG. 1 illustrates a user wearing a motion assistance apparatus according to at least one example embodiment, and FIG. 2 is a perspective view illustrating the motion assistance apparatus according to at least one example embodiment.

Referring to FIGS. 1 and 2, a motion assistance apparatus 100 may be worn by a user to assist a motion of the user. The user may correspond to a human, an animal, or a robot. However, the user is not limited thereto. The motion assistance apparatus 100 may include a proximal support 20, a distal support 30, and a driving assembly 10.

The proximal support 20 and the distal support 30 may be on opposite sides of a part of the user to support a proximal part and a distal part, respectively. For example, the proximal support 20 may support a waist and/or a pelvis, and the distal support 30 may support a thigh, a knee, a calf, and/or a foot. The proximal support 20 may include a detachable belt to support the entire waist of the user, and the distal support 30 may include a detachable belt to support the entire thigh of the user. However, example embodiments are not limited thereto.

For example, in another example embodiment, the proximal support 20 and the distal support 30 may be on opposite sides of an upper arm of the user. The proximal support 20 may support a shoulder and/or a back, and the distal support 30 may support a forearm. The proximal support 20 may include a detachable belt to support the entire shoulder of the user, and the distal support 30 may include a detachable belt to support the entire forearm of the user or include a structure that encloses the entire forearm.

The driving assembly 10 may rotate the distal support 30 relative to the proximal support 20. For example, based on a sagittal plane, the driving assembly 10 may rotate the distal support 30 relative to the proximal support 20. That is, the driving assembly 10 may rotate the distal support 30, thereby assisting a flexion and/or extension motion of the thigh of the user.

The proximal support 20 and the distal support 30 may rotate relative to each other based on a frontal plane. For example, the driving assembly 10 may be on one side of the proximal support 20, and a hinge 133 may be between the distal support 30 and the driving assembly 10. In the above structure, when the user performs an adduction and/or abduction motion of the thigh, the proximal support 20 may rotate on the hinge 133 relative to the distal support 30.

As discussed in more detail below, the driving assembly 10 may include, amongst other elements, a driving frame 13 that includes a fixing plate 131 connected to the driving assembly 10 via a frame fastening screw 1311 and connected to a rotary bar 132 via the hinge 133.

Figure 3:
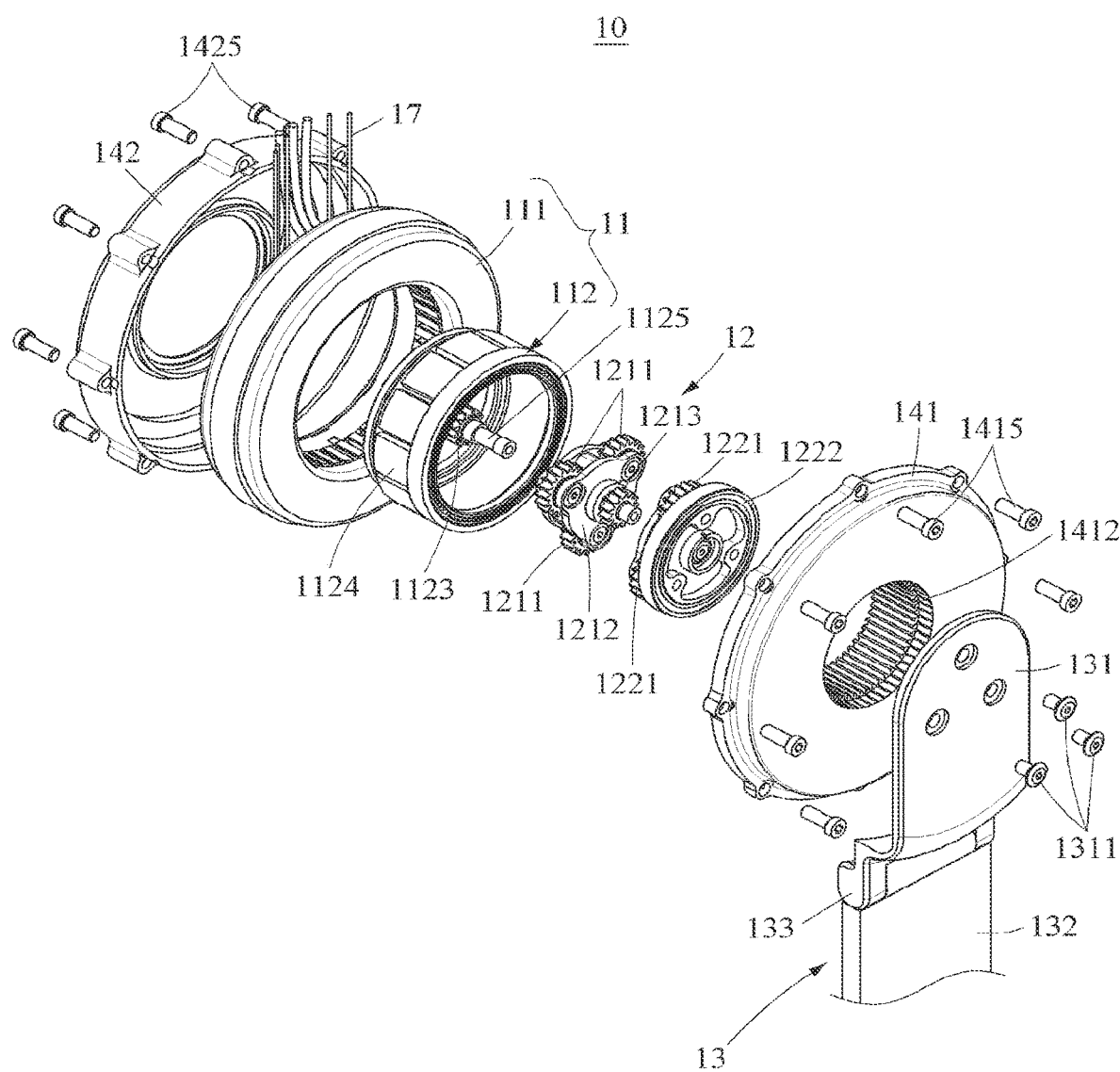
FIG. 3 is an exploded perspective view illustrating a driving assembly, viewed from a front according to at least one example embodiment.
Figure 4:
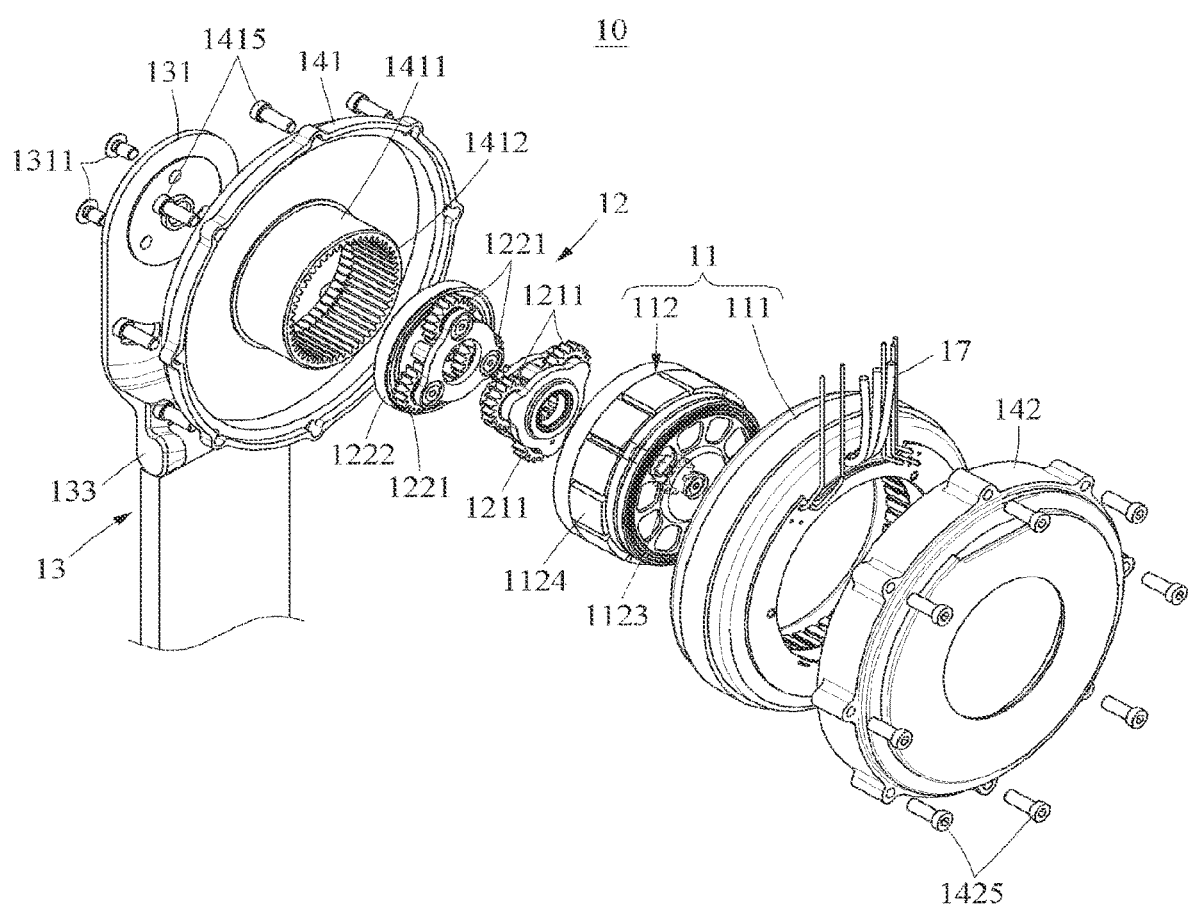
FIG. 4 is an exploded perspective view illustrating a driving assembly, viewed from a back according to at least one example embodiment.
Figure 5:
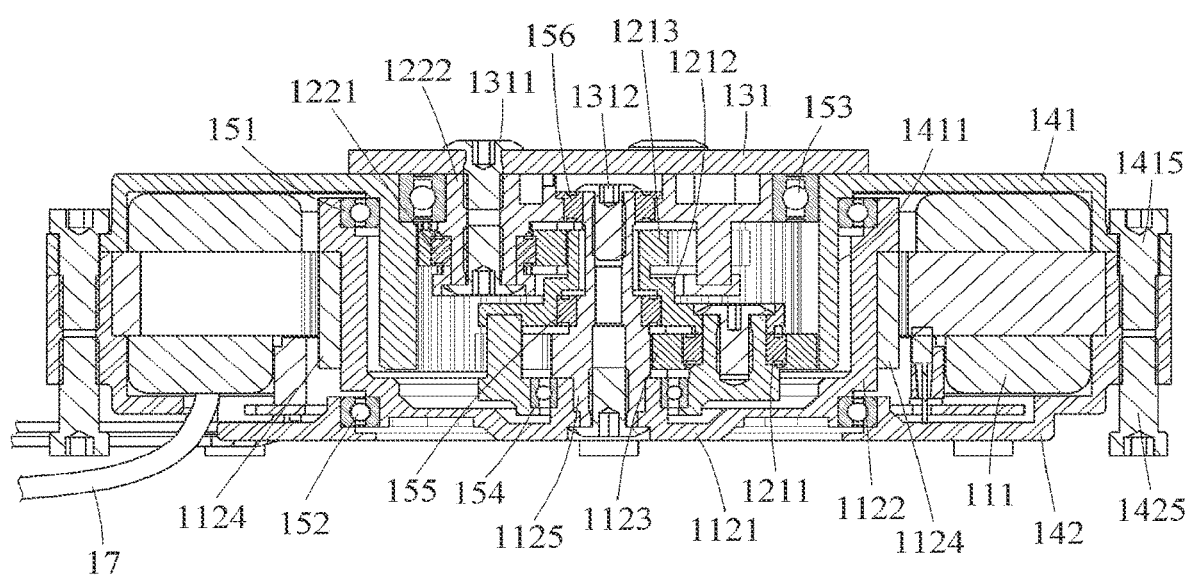
FIG. 5 is a cross-sectional view illustrating a motion assistance apparatus, cut along a line I-I of FIG. 2.

FIG. 3 is an exploded perspective view illustrating a driving assembly, viewed from a front according to at least one example embodiment, FIG. 4 is an exploded perspective view illustrating the driving assembly, viewed from a back according to at least one example embodiment, and FIG. 5 is a cross-sectional view illustrating a motion assistance apparatus, cut along a line I-I of FIG. 2.

Referring to FIGS. 3 through 5, the driving assembly 10 may include an actuator 11, a reducer 12, the driving frame 13, an upper cover 141, a lower cover 142, a plurality of bearings 151-156, and/or a connecting line 17.

The actuator 11 may include a stator 111 and/or a rotor 112. The actuator 11 may be a hollow actuator having an internal space such that the actuator 11 is configured to receive, for example, the reducer 12 into the internal space. In the above structure, a width of the driving assembly 10, that is, a vertical distance from the lower cover 142 to the driving frame 13, may be reduced. By reducing a protruding height of the entire driving assembly 10 from the user, a volume of the entire motion assistance apparatus 100 of FIG. 1 may be reduced, and thus the user may wear the motion assistance apparatus 100 under clothing. The stator 111 may be connected to the proximal support 20. The stator 111 may generate a magnetic field to rotate the rotor 112. The stator 111 may have a ring shape including a hole at a central portion. For example, the stator 111 may have a doughnut shape. However, the shape of the stator 111 is not limited thereto.

The rotor 112 may rotate relative to the stator 111. For example, the rotor 112 may be enclosed by the stator 111. The rotor 112 may have a cup shape. The rotor 112 may include a main plate 1121, a vertical extension 1122, a sun gear 1123, a plurality of permanent magnet s1124, and/or a rotor shaft 1125.

The main plate 1121 may be a plate parallel to a plane perpendicular to a central axis of the stator 111. The vertical extension 1122 may be a portion that vertically extends from an edge portion of the main plate 1121 in one direction. The main plate 1121 and the vertical extension 1122 may form a cup shape together. The reducer 12 may be inserted in a space formed by the main plate 1121 and the vertical extension 1122.

The plurality of permanent magnets 1124 may be provided along an outer circumference surface of the vertical extension 1122. For example, the plurality of permanent magnets 1124 may each have a shape bent to have the same curvature as the vertical extension 1122, and the plurality of permanent magnets 1124 may be a predetermined (or alternatively, a desired) distance spaced apart from each other. The plurality of permanent magnets 1124 may interoperate with the magnetic field generated by the stator 111. When the plurality of permanent magnets 1124 interoperates with the magnetic field generated by the stator 111, the rotor 112 may rotate in one direction.

The sun gear 1123 may protrude at a center of the main plate 1121. The sun gear 1123 may rotate with the main plate 1121 as an integral body. For example, the rotor shaft 1125 may protrude at the center of the main plate 1121, and the sun gear 1123 may be fixed to the rotor shaft 1125. The sun gear 1123 may correspond to an output end of the actuator 11. The output end of the actuator 11 may be connected to an input end of the reducer 12. For example, the sun gear 1123 may be connected to the input end of the reducer 12.

The upper cover 141 and the lower cover 142 may enclose the actuator 11. The upper cover 141 and the lower cover 142 may fix the stator 111, and support the rotor 112 such that the rotor 112 may rotate relative to the stator 111. The lower cover 142 may be connected to the proximal support 20, and may fix a bottom of the stator 111. The upper cover 141 may be connected to the lower cover 142, and may fix a top of the stator 111. A vertical motion and a horizontal motion of the stator 111 may be restricted by the lower cover 142 and the upper cover 141. That is, the stator 111 may be fixed between the lower cover 142 and the upper cover 141 such that the stator 111 does not shake when the rotor 112 rotates.

The upper cover 141 may include a protrusion 1411 that extends toward an internal space of the stator 111. For example, the protrusion 1411 may be a cylindrical member that protrudes from a central portion of the upper cover 141 toward the lower cover 142. The vertical extension 1122 may be between the protrusion 1411 and the stator 111.

A lower cover fastening screw 1425 may fasten the lower cover 142 and the proximal support 20 of FIG. 1 together. The lower cover 142 may be fastened to the proximal support 20 by the lower cover fastening screw 1425. A plurality of lower cover fastening screws 1425 may be provided along a circumference of the lower cover 142.

An upper cover fastening screw 1415 may fasten the upper cover 141 and the lower cover 142 together. The upper cover 141 may be fastened to the lower cover 142 by the upper cover fastening screw 1415. A plurality of upper cover fastening screws 1415 may be provided along a circumference of the upper cover 141.

A plurality of bearings 151-156 may assist the rotor 112 to stably rotate relative to the stator 111. The plurality of bearings 151-156 may assist the rotor 112 to maintain a predetermined (or, alternatively, a desired) distance from the stator 111. That is, the plurality of bearings 151-156 may reduce or prevent the rotor 112 from approaching the protrusion 1411 of the upper cover 141 or the stator 111.

The plurality of bearings 151-156 may include a first bearing 151, a second bearing 152, and a third bearing 153. The first bearing 151 may be between the rotor 112 and the upper cover 141. The second bearing 152 may be between the rotor 112 and the lower cover 142.

The first bearing 151 may be in contact with a top and an inner side of the rotor 112, and the second bearing 152 may be in contact with a bottom and an outer side of the rotor 112. In the above arrangement, the first bearing 151 and the second bearing 152 may reduce or prevent a vertical shake of the rotor 112, and reduce or prevent a lateral shake of the rotor 112. That is, the center of the rotor 112 may continuously match a center of the stator 111.

The reducer 12 may be inserted in the actuator 11. For example, the reducer 12 may be inserted in a space enclosed by the vertical extension 1122 of the rotor 112. The sun gear 1123 corresponding to the output end of the actuator 11 may be connected to the input end of the reducer 12. Hereinafter, a reduction mechanism of the reducer 12 will be described in detail.

The main plate 1121 of the rotor 112 may include the rotor shaft 1125 that protrudes at the center of the main plate 1121, and a first sun gear 1123 fixed to the rotor shaft 1125. The protrusion 1411 of the upper cover 141 may include a ring gear 1412 provided from an inner side of the protrusion 1411 toward a center of the protrusion 1411.

The reducer 12 may include a plurality of first planetary gears 1211, a first carrier 1212, a second sun gear 1213, a plurality of second planetary gears 1221, and a second carrier 1222.

The plurality of first planetary gears 1211 may be connected to the sun gear 1123 corresponding to the output end of the actuator 11. That is, the plurality of first planetary gears 1211 may correspond to the input end of the reducer 12. The second carrier 1222 may be connected to the driving frame 13. That is, the second carrier 1222 may correspond to an output end of the reducer 12.

The plurality of first planetary gears 1211 may be between the first sun gear 1123 and the ring gear 1412. The first planetary gears 1211 may be provided along a circumference of the first sun gear 1123 to be a predetermined (or alternatively, a desired) distance spaced apart from each other. The first planetary gears 1211 may have gear shapes that engage with the first sun gear 1123. One side of the first planetary gears 1211 may be in contact with the first sun gear 1123, and another side of the first planetary gears 1211 may be in contact with the ring gear 1412. The ring gear 1412 may be on the protrusion 1411 of the upper cover 141, and thus maintain a state of being fixed. When the first sun gear 1123 rotates, the plurality of first planetary gears 1211 may rotate along the circumference of the first sun gear 1123.

The first carrier 1212 may be connected to a central axis of each of the plurality of first planetary gears 1211. When the central axis of each of the plurality of first planetary gears 1211 revolves around the first sun gear 1123, the first carrier 1212 may rotate on the first sun gear 1123 at an angular velocity equal to an angular velocity of the central axis of each of the plurality of first planetary gears 1211. The central axis of each of the plurality of first planetary gears 1211 may be coupled to the first carrier 1212, and thus the central axis of each of the plurality of first planetary gears 1211 may revolve at the same angular velocity. A rotation velocity of the first carrier 1212 may be reduced when compared to a rotation velocity of the first sun gear 1123.

That is, a torque output from the first carrier 1212 may be greater than a torque transmitted from the first sun gear 1123 to the first planetary gears 1211.

The second sun gear 1213 may be at a center of the first carrier 1212. The second sun gear 1213 and the plurality of first planetary gears 1211 may be on opposite sides of the first carrier 1212. For example, in FIG. 5, in a case in which the central axes of the plurality of first planetary gears 1211 are connected to a bottom of the first carrier 1212, the second sun gear 1213 may be on a top of the first carrier 1212. The second sun gear 1213 may rotate at the same angular velocity as the first carrier 1212.

The plurality of second planetary gears 1221 may be between the second sun gear 1213 and the ring gear 1412. The second planetary gears 1221 may be provided along a circumference of the second sun gear 1213 to be a predetermined or alternatively, desired distance spaced apart from each other. The second planetary gears 1221 may have gear shapes that engage with the second sun gear 1213. One side of the second planetary gears 1221 may be in contact with the second sun gear 1213, and another side of the second planetary gears 1221 may be in contact with the ring gear 1412. The ring gear 1412 may be on the protrusion 1411 of the upper cover 141, and thus maintain a state of being fixed. When the second sun gear 1213 rotates, the plurality of second planetary gears 1221 may revolve along the circumference of the second sun gear 1213.

The second carrier 1222 may be connected to a central axis of each of the plurality of second planetary gears 1221. When the central axis of each of the plurality of second planetary gears 1221 revolves around the second sun gear 1213, the second carrier 1222 may rotate on the second sun gear 1213 at an angular velocity equal to an angular velocity of the central axis of each of the plurality of second planetary gears 1221. The central axis of each of the plurality of second planetary gears 1221 may be coupled to the second carrier 1222, and thus the central axis of each of the plurality of second planetary gears 1221 may revolve at the same angular velocity. A rotation velocity of the second carrier 1222 may be reduced when compared to a rotation velocity of the first carrier 1212. That is, a torque output from the second carrier 1222 may be greater than the torque output from the first carrier 1212. The second carrier 1222 may correspond to the output end of the reducer 12. A driving torque generated by the driving assembly 10 may increase from the input end of the reducer 12 toward the output end of the reducer 12.

One end of the driving frame 13 may be connected to the output end of the reducer 12. For example, the one end of the driving frame 13 may be connected to the second carrier 1222. Another end of the driving frame 13 may be connected to the distal support 30 of FIG. 1. The driving frame 13 may transfer power received from the reducer 12 to the distal support 30.

As discussed above, the hollow actuator 11 may have a hollow structure such that the reducer 12 is inserted therein, and the upper cover 141 of the drive assembly may include the protrusion 1411 having the ring gear 1412 therein that encloses and engages with the plurality of planetary gears 1211, 1221 of the reducer 12. Therefore, the drive assembly 10 may have a reduced width from the lower cover 142 to the driving frame 13 of the drive assembly 10.

FIGS. 3 through 5 illustrate an example of the reducer 12 including two planetary gear sets. However, the structure of the reducer 12 is not limited thereto. For example, in other example embodiments, the reducer 12 may include a single planetary gear set 1211, 1221 such that the first carrier 1212 of the reducer 12 may be connected directly to the driving frame 13.

The plurality of bearings 151-156 may reduce or prevent shaking of central axes of the first sun gear 1123, the first planetary gears 1211, the first carrier 1212, the second sun gear 1213, the second planetary gears 1221, and the second carrier 1222, respectively.

In FIG. 5, the first bearing 151 may be in contact with the top and the inner side of the rotor 112, and the second bearing 152 may be in contact with the bottom and the outer side of the rotor 112. In the above disposition, the first bearing 151 and the second bearing 152 may reduce or prevent a vertical shake and a lateral shake of the rotor 112. That is, the first bearing 151 and the second bearing 152 may match the center of the rotor 112 and the center of the stator 111. In the above structure, the shake of the central axis of the first sun gear 1123 may be reduced or prevented.

The third bearing 153 may be between the upper cover 141 and the second carrier 1222. The second carrier 1222 may receive force applied in a radial direction in response to a movement of the driving frame 13. When the force is applied to the second carrier 1222 in the radial direction, the third bearing 153 may reduce or prevent shaking of the second carrier 1222. That is, the third bearing 153 may reduce or prevent the shaking of the central axis of the second carrier 1222.

The plurality of bearings 151-156 may further include a fourth bearing 154, a fifth bearing 155 and a sixth bearing 156. The fourth bearing 154 may be between a lower side of the first carrier 1212 that supports the plurality of first planetary gears 1211 and the rotor shaft 1125. For example, the fourth bearing 154 may assist the first carrier 1212 to smoothly rotate along an outer circumference surface of the rotor shaft 1125. The fourth bearing 154 may maintain a predetermined (or alternatively, a desired) distance between the lower side of the first carrier 1212 and the rotor shaft 1125.

The fifth bearing 155 may be between an upper side of the first carrier 1212 that supports the plurality of first planetary gears 1211 and the rotor shaft 1125. For example, the fifth bearing 155 may assist the first carrier 1212 to smoothly rotate along the outer circumference surface of the rotor shaft 1125. The fifth bearing 155 may maintain a predetermined (or, alternatively, a desired) distance between the upper side of the first carrier 1212 and the rotor shaft 1125.

The fourth bearing 154 and the fifth bearing 155 may support the lower side and the upper side of the first carrier 1212, respectively, thereby reducing or preventing the shaking of the first carrier 1212 and the plurality of first planetary gears 1211.

The sixth bearing 156 may be between the rotor shaft 1125 and the second carrier 1222. For example, the sixth bearing 156 may assist the second carrier 1222 to rotate along the outer circumference surface of the rotor shaft 1125. The sixth bearing 156 may maintain a predetermined (or alternatively, a desired) distance between the rotor shaft 1125 and the second carrier 1222. The sixth bearing 156 may reduce or prevent the shaking of the second carrier 1222.

The sixth bearing 156 may be a flange bearing. A cylindrical portion of the sixth bearing 156 may be inserted into a hole at a center of the second carrier 1222, and a rotor shaft fastening screw 1312 may be provided to overlap a flange portion of the sixth bearing 156, thereby reducing or preventing a separation of the sixth bearing 156 from the second carrier 1222. The rotor shaft fastening screw 1312 may be tightened and coupled to the rotor shaft 1125. For example, the rotor shaft 1125 may include a thread on an inner circumference surface, and the rotor shaft fastening screw 1312 may include a thread on an outer circumference surface.

The driving frame 13 may be rotatably connected to one side of the proximal support 20. The fixing plate 131 of the driving frame 13 may be fastened to the reducer 12 of the driving assembly 10 of FIG. 3 by the frame fastening screw 1311. A bearing or a friction reducing plate may be between the fixing plate 131 and the upper cover 141.

The driving frame 13 may include the fixing plate 131 connected to the reducer 12 of FIG. 3, the hinge 133 connected to one end of the fixing plate 131, and the rotary bar 132 connected to the hinge 133. A portion of the fixing plate 131 connected to the hinge 133 may have a shape bent toward the proximal part of the user. By the above shape, an axis of the hinge 133 may be close to an adduction axis and an abduction axis of a hip joint of the user. The rotary bar 132 may be connected to the distal support 30.

The connecting line 17 may be connected to the stator 111 and extend outward. The connecting line 17 may electrically connect a controller (not shown) and the stator 111. The controller may control the magnetic field generated by the stator 111.

For example, the controller may include a memory and a processor (not shown).

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processor may be an arithmetic logic unit, a digital signal processor, a microcomputer, a field programmable array, a programmable logic unit, a microprocessor or any other device capable of responding to and executing instructions in a defined manner.

The memory may contain computer readable code that, when executed by the processor, configures the processor as a special purpose computer to control the magnetic field generated by the stator 111 and, thus, control a speed of rotation of the rotor 112 of the driving assembly 10.

FIG. 6 illustrates a motion assistance apparatus according to at least one example embodiment.

Referring to FIG. 6, a motion assistance apparatus 200 may include a proximal support 20, a first actuator 71, a first reducer 81, a first driving frame 50, a second actuator 72, a second reducer 82, and/or a second driving frame 60.

The proximal support 20 may support a proximal part of a user. The proximal support 20 may support a waist and/or a pelvis of the user.

The first actuator 71 may be connected to one side of the proximal support 20. The first actuator 71 may be a hollow actuator. For example, the first actuator 71 may include a ring-shaped stator, and a cup-shaped rotor that is connected to rotate in the stator.

The first reducer 81 may be inserted in the first actuator 71. For example, the first reducer 81 may be inserted in the cup-shaped rotor. In the above structure, although the first reducer 81 is connected to the first actuator 71, a thickness of the first actuator 71 may not increase. The first reducer 81 may be connected to the first actuator 71. An input end of the first reducer 81 may be connected to an output end of the first actuator 71.

The first driving frame 50 may be connected to the first reducer 81. For example, one end of the first driving frame 50 may be connected to an output end of the first reducer 81. The first driving frame 50 may include a first distal support 30. In a case in which the proximal support 20 supports the waist or a hip of the user, the first distal support 30 may support a thigh of the user. In this example, the first driving frame 50 may assist a flexion and/or extension motion of a hip joint of the user. The first reducer 81 may be at one end of the first driving frame 50, and the second actuator 72 may be at another end of the first driving frame 50.

The second actuator 72 may be connected to one side of the first driving frame 50. The second actuator 72 may be a hollow actuator. For example, the second actuator 72 may include a ring-shaped stator, and a cup-shaped rotor that is connected to rotate in the stator.

The second reducer 82 may be inserted in the second actuator 72. For example, the second reducer 82 may be inserted in the cup-shaped rotor. In the above structure, although the second reducer 82 is connected to the second actuator 72, a thickness of the second actuator 72 may not increase. The second reducer 82 may be connected to the second actuator 72. An input end of the second reducer 82 may be connected to an output end of the second actuator 72.

The second driving frame 60 may be connected to the second reducer 82. For example, one end of the second driving frame 60 may be connected to an output end of the second reducer 82. The second driving frame 60 may include a second distal support 40. In a case in which the proximal support 20 supports the waist or the hip of the user and the first distal support 30 supports the thigh of the user, the second distal support 40 may support a calf of the user. In this example, the second driving frame 60 may assist a flexion and/or extension motion of a knee joint of the user.

The first reducer 81 and the second actuator 72 may be connected to the same side of the first driving frame 50. For example, as illustrated in FIG. 6, the first reducer 81 and the second actuator 72 may be connected to a left side of the first driving frame 50. In the above structure, a separation distance between the motion assistance apparatus 200 and a body of the user may be reduced.

Meanwhile, in other example embodiments, one of the first actuator 71 and the second actuator 72, and the first distal support 30 may be omitted. In this example, irrespective of a motion of a joint between the proximal support 20 and the second distal support 40, for example, the knee joint, a distance between the proximal support 20 and the second distal support 40 may be changed by controlling the first actuator 71 or the second actuator 72 based on a spring-mass model, whereby a motion of a leg of the user may be implemented.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wearable apparatus, comprising:
a waist support including a detachable waist belt configured to be worn on a waist of a user;
a thigh support including a detachable thigh belt configured to be worn on a thigh of the user;
a hollow actuator connected to the waist support, the hollow actuator including a stator and a rotor configured to be rotatable;
a reducer connected to a rotor shaft;
a driving frame configured to connect the reducer to the thigh support; and
a housing including a lower cover and an upper cover, the lower cover connected to the waist support and configured to fix the stator, and the upper cover connected to the lower cover and configured to fix the stator,
wherein the upper cover includes a protrusion including a ring gear at an inner side thereof,
wherein the rotor includes a first sun gear,
wherein the reducer includes:
a plurality of first planetary gears between at least the first sun gear and the ring gear; and
a first carrier connected to a central axis of each of the plurality of first planetary gears,
wherein the rotor comprises both a main plate part of the rotor and a vertical extension part of the rotor, wherein the vertical extension part of the rotor extends from edge of the main plate part of the rotor in a first direction,
wherein the reducer is within the protrusion and the protrusion is within the vertical extension part of the rotor.

2. The wearable apparatus of claim 1, wherein
wherein the reducer further includes:
a second sun gear at a center of the first carrier;
a plurality of second planetary gears between the second sun gear and the ring gear; and
a second carrier connected to a central axis of each of the plurality of second planetary gears,
wherein the driving frame is connected to the second carrier.

* * * * *